(12) United States Patent
Rollet et al.

(10) Patent No.: US 6,259,975 B1
(45) Date of Patent: Jul. 10, 2001

(54) FLIGHT CONTROL SYSTEM FOR AN AIRCRAFT PARTICULARLY FOR A HELICOPTER

(75) Inventors: Philippe Alain Jean Rollet, Velaux; Serge Joseph Mezan, Sausset-les-Pins, both of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/295,259

(22) Filed: Apr. 20, 1999

(30) Foreign Application Priority Data

Apr. 21, 1998 (FR) .................................................. 98 04957

(51) Int. Cl.$^7$ ............................. G06F 7/00; G06F 17/00
(52) U.S. Cl. ............................. 701/3; 701/4; 701/14; 701/16; 342/33; 244/75 R; 244/76 R; 244/175
(58) Field of Search ..................... 701/3, 4, 14, 200, 701/205, 16; 244/75 R, 76 R, 175, 17.11; 342/33

(56) References Cited

U.S. PATENT DOCUMENTS

| | | | |
|---|---|---|---|
| 3,620,488 | * | 11/1971 | Miller .................................. 244/185 |
| 4,648,269 | * | 3/1987 | Durand .............................. 73/178 H |
| 4,947,334 | * | 8/1990 | Massey et al. ........................... 701/3 |
| 4,970,651 | * | 11/1990 | Favre et al. ............................. 701/4 |
| 5,222,691 | * | 6/1993 | Gold et al. ......................... 244/17.13 |
| 5,265,826 | * | 11/1993 | Ebert et al. ........................ 244/17.13 |
| 5,952,570 | * | 9/1999 | Berlioz et al. ...................... 73/178 H |
| 5,984,240 | * | 11/1999 | Shinagawa ........................... 244/195 |
| 6,023,653 | * | 2/2000 | Ichimura et al. ..................... 701/208 |
| 6,059,225 | * | 5/2000 | Vidal et al. ....................... 244/17.13 |
| 6,059,226 | * | 5/2000 | Cotton et al. ..................... 244/17.13 |
| 6,062,513 | * | 5/2000 | Lambregts ........................... 244/175 |
| 6,067,484 | * | 5/2000 | Rowson et al. . |
| 6,077,077 | * | 6/2000 | Geipe .................................... 434/30 |

FOREIGN PATENT DOCUMENTS

| | | |
|---|---|---|
| 2711432 | 4/1995 | (FR) . |
| 9305464 | 3/1993 | (WO) . |
| 9534029 | 12/1995 | (WO) . |

\* cited by examiner

Primary Examiner—William A Cuchlinski, Jr.
Assistant Examiner—Olga Hernandez
(74) Attorney, Agent, or Firm—Stevens, Davis, Miller & Mosher, LLP

(57) ABSTRACT

A flight control system for an aircraft, particularly for a helicopter receives a number of items of information, especially the position of flight control members of said aircraft, and sends, depending on these items of information, control inputs to controls of the aircraft. The flight control system includes at least one sensor which measures values representative of the flight of the aircraft and computing means which generate, at least from these measured values and from the positions of flight control members, corrected control inputs which are sent to the controls and which enable control of the lateral speed of the aircraft with respect to the ground, without varying the course of the aircraft.

10 Claims, 3 Drawing Sheets

FLIGHT CONTROL SYSTEM FOR AN AIRCRAFT PARTICULARLY FOR A HELICOPTER

BACKGROUND OF THE INVENTION

1. Field of the Invention

The present invention relates to a flight control system for an aircraft, particularly for a helicopter.

Said flight control system is intended more particularly, although not exclusively, for facilitating ground approaches, for the purpose of landing, with a strong crosswind, in particular steep approaches in poor visibility.

2. Description of the Related Art

Usually, when a helicopter makes a so-called "instrument" approach, following a guidance direction (or approach path), for example a guidance beam emitted by a ground marker, it corrects the lateral deviations, for example the drift caused by a crosswind, by a course modification in the appropriate direction. It thus produces a lateral speed with respect to the ground, which allows it to return to the approach path if it deviates therefrom.

This usual mode of approach, by course modification, although widely used does have several drawbacks, especially in the case of aircraft, such as a helicopter or a tilt-rotor aircraft, which are capable of making steep approaches at low speed.

This is because, at low speed, which is necessary in the case of a steep approach, controlling the course by the roll become difficult since the slightest inclination generates a large yaw rotation.

In addition, compensation for a strong crosswind or correction of a drift generated especially by a strong crosswind relative to the approach path generally requires a very large course deviation with respect to the alignment with said approach path.

In practice, this course deviation sometimes amounts to values greater than 30°, something which is hardly acceptable, especially for safety reasons.

The object of the present invention, which relates to a suitable flight control system, is to remedy these drawbacks.

SUMMARY OF THE INVENTION

For this purpose, according to the invention, said flight control system for an aircraft, particularly for a helicopter, of the type receiving a number of items of information, especially the positions of flight control members of said aircraft, and sending, depending on these items of information, control inputs to control of the aircraft, is noteworthy in that it comprises:

- at least one sensor which measures actual values of at least one parameter representative of the flight of said aircraft; and
- computing means which generate, at least from said measured actual values and from positions of flight control members, corrected control inputs which are intended to be sent to said controls and which make it possible to control, without external visual references, the lateral speed of said aircraft with respect to the ground, without varying the course of said aircraft.

Thus, by virtue of the invention, it is possible to control the lateral speed of the aircraft with respect to the ground, i.e. to compensate for or correct the effect of a crosswind, without correspondingly varying the course, it being possible, for example, for the latter to remain aligned with respect to a guidance direction during a ground approach.

This allows optimum use of the sideways flight capability of said aircraft, for example a helicopter, and thus makes it easier to fly it, especially during approaches.

It should be noted that, in the context of the present invention:

- the term "ground" should not be limited to a fixed terrestrial surface, such as a landing pad of a heliport for example, but relates to any surface, even a moving surface, such as the platform of a ship capable of acting as a landing area for said aircraft; and
- the system according to the invention may be applied both to an aircraft provided with a fly-by-wire or fly-by-light device and to an aircraft provided with mechanical flight controls or with an autopilot.

Moreover, said computing means advantageously generate corrected control inputs in order to keep the direction of the speed (and therefore the path) of said aircraft with respect to the ground constant during a modification of the course and/or a modification of the longitudinal speed of the latter.

This embodiment is, in particular, especially advantageous and useful during an approach phase, in particular when the path of the aircraft is aligned with respect to a guidance direction.

This is because, in this situation, a course rotation control, an acceleration and/or a deceleration of the aircraft have/has no influence on the path which, by virtue of the invention, remains aligned with respect to the guidance direction, which thus makes landing very much easier.

Furthermore, said computing means are advantageously actuable. They may therefore be actuated and de-actuated, either manually by the pilot or automatically, for example depending on the flight phases, to be used only when the control assistance that they provide is necessary or useful, i.e. especially during a landing.

In a preferred embodiment, said system is noteworthy in that said computing means comprise:

- a first computing unit which computes at least one reference value, for example a lateral speed, a longitudinal speed and/or a longitudinal acceleration, specified below, from said measured actual values; and
- a second computing unit which generates said corrected control inputs from at least said reference value and from positions of flight control members.

Furthermore, in order to make flying or decision-taking by the pilot(s) easier, the system according to the invention advantageously includes, in addition:

- a value indicator capable of indicating, to a pilot of the aircraft, the value of the lateral speed of the aircraft with respect to the ground; and
- a position indicator which is coupled to said value indicator and which is capable of indicating, to a pilot of the aircraft, the position of the latter with respect to a defined path.

DESCRIPTION OF THE DRAWINGS

The figures of the appended drawing will make it clearly understood how the invention may be realized. In these figures, identical references denote similar components.

DETAILED DESCRIPTION OF THE INVENTION

Figure 1:
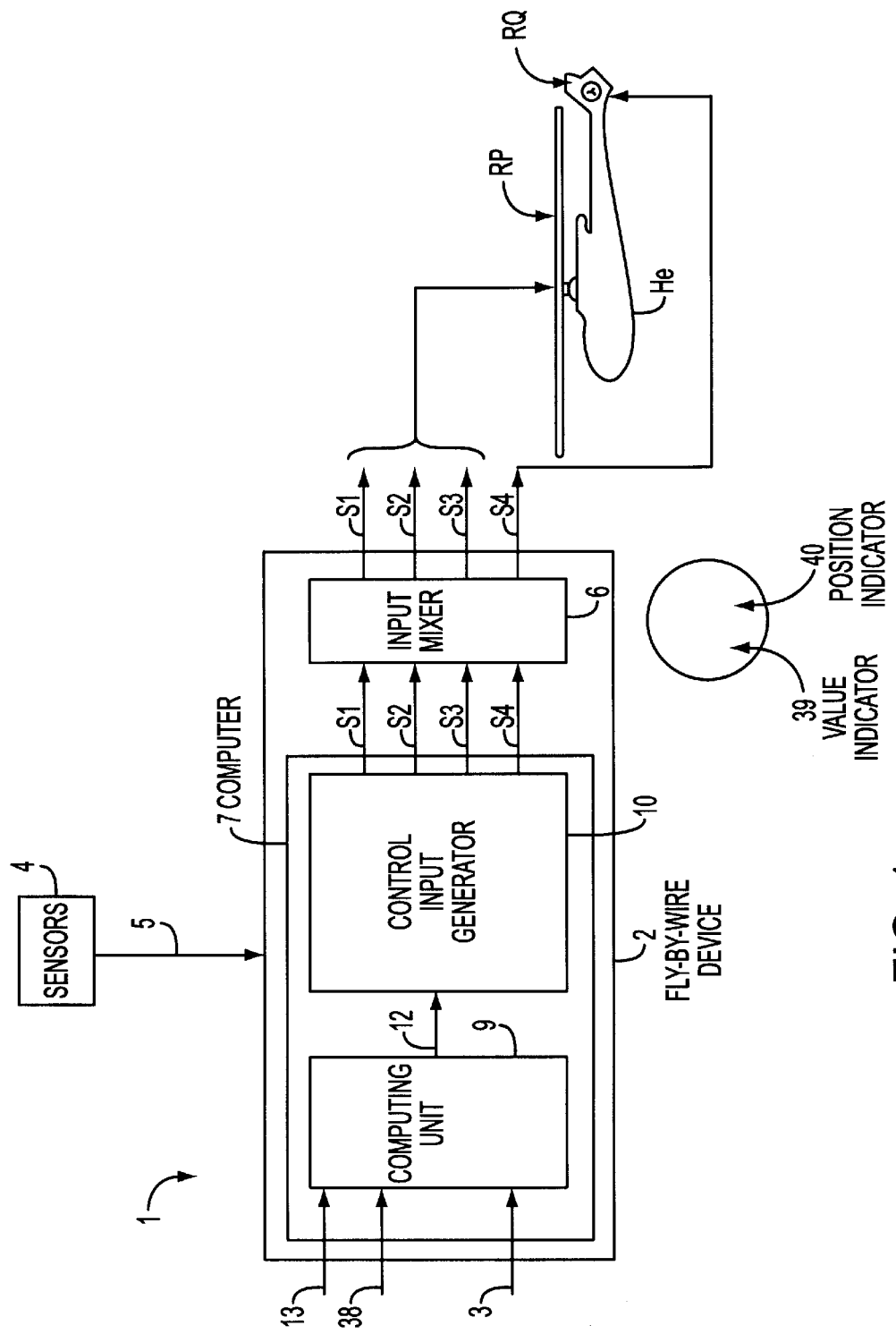
FIG. 1 is a block diagram of a flight control system according to the invention, applied to a helicopter.

The flight control system 1 according to the invention, and shown diagrammatically in FIG. 1, is mounted on board a rotating-wing aircraft to be flown, in this case a helicopter He, although, for the sake of clarity of the drawing, the helicopter He is shown on a small scale, externally to said flight control system 1.

In the example shown, the helicopter He includes a main rotor RP intended to provide lift and forward motion, as well as a tail rotor RQ, intended to provide balance and yaw control of the helicopter He.

The illustrative embodiment of the flight control system 1 for the helicopter He, shown diagrammatically in FIG. 1, includes a fly-by-wire device 2 which receives a number of items of information and issues control inputs. For this purpose, in the example in question, associated with said device 2 in a known manner are:

- control members (not shown) and associated transducers, which are also not shown and which send items of information relating to the positions of said control members to said device 2 via a link 3;
- a set 4 of sensors, mounted on board the helicopter He and delivering, in the form of electric signals, a number of items of information about the status of said helicopter He, such as air speed, ground speed, angular speeds, angular accelerations, attitudes, load factors, etc., said items of information being sent to the device 2 via a link 5; and
- an input mixer 6 which receives, via links S1 to S4, control inputs generated by a unit 10 of a computer 7 of the device 2 based on the signals sent via the links 3 and 5, and which sends control inputs, via links s1 to s3, to servocontrols for the main rotor RP and, via a link s4, to a servocontrol for the tail rotor RQ.

In a known manner, said fly-by-wire device 2 determines, using an algorithm which is built into the computer 7, the inputs for controlling said rotors RP and RQ, taking account both:

- of items of information relating to the respective positions of the aforementioned flight control members which can be actuated by a pilot of the helicopter He; and
- of items of information delivered by the set 4 of sensors, relating to the status of said helicopter He.

Accordingly to the invention, said system 1 additionally includes computing means 9 of the computer 7 which generate, at least from values received from said set 4 of sensors via the link 5 and from the positions (angle errors or absolute positions) of flight control members, received via the link 3, corrected control inputs sent to the unit 10 via a link 12 and making it possible to control the lateral speed of said helicopter He with respect to the ground, without varying the course of said helicopter.

Thus, by virtue of said computing means 9, it is possible to control the lateral speed of the helicopter, especially without external visual references, i.e. to compensate for or correct a lateral deviation, and especially the effect of a crosswind, without correspondingly varying the course, it being possible, for example, for the latter to remain aligned with respect to a guidance direction during a ground approach.

This allows optimum use of the sideways flight capability of the helicopter He and thus makes it easier to fly it, especially during approaches.

In addition, according to the invention, said computing means 9 generate corrected control inputs in order to keep the direction of the speed (i.e. the direction of the speed vector) and therefore the path of said helicopter He with respect to the ground constant during a modification of the course and/or a modification of the longitudinal speed of the latter, as will be seen in greater detail below.

Of course, said computing means 9 according to the invention are actuable and de-actuable, so that they generate and send corrected control inputs only in the case of flight situations for which the aforementioned effects are necessary and when said means 9 have been actuated.

According to the invention, an actuation or de-actuation input may be sent to said means 9 via a link 13:

- either manually by a pilot of the helicopter He;
- or automatically, for example, depending on the flight conditions or on predetermined flight phases.

By way of example, said computing means 9 may be advantageously actuated during an approach, just after the helicopter He has picked up an approach guidance beam (not shown).

Thus, by virtue of the invention, said helicopter He is capable of compensating for the effect of a crosswind, while still keeping the course aligned with respect to said guidance beam, this applying even in the case of controlled accelerations or decelerations of said helicopter He with respect to the longitudinal path, such decelerations generally having to be made in order to allow landing.

The present invention also allows strategy continuity in the case of flight deviation correction between a translational flight and a hovering flight.

Figure 2:
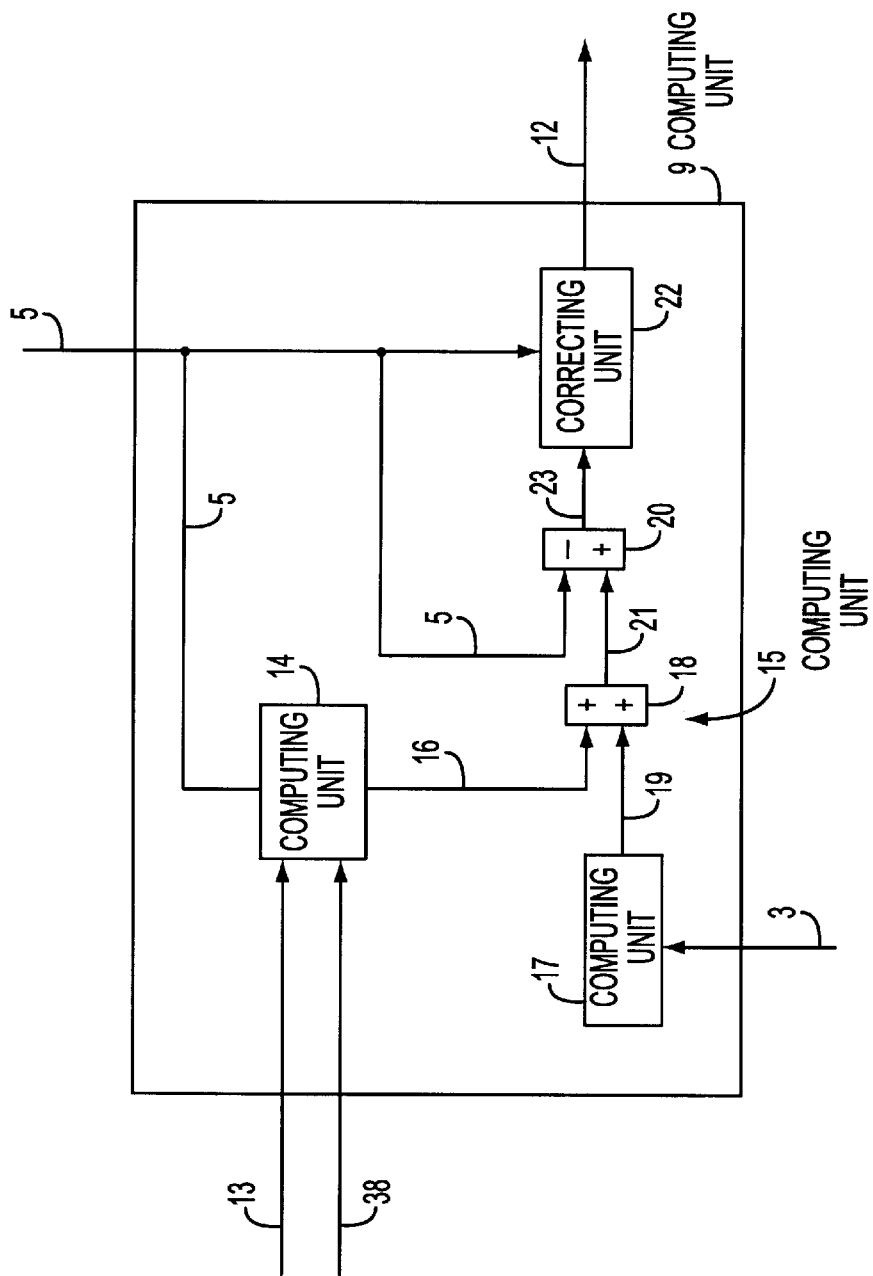
FIG. 2 illustrates diagrammatically the principle of the invention with respect to the roll axis of the helicopter.

FIG. 2 shows diagrammatically a preferred embodiment of the computing means 9 for controlling, according to the invention, the roll axis of the helicopter He.

For this purpose, said computing means 9 include:

- a computing unit 14 which calculates, from measured actual values, which are received from the set 4 of sensors via the link 5 and are specified below, a lateral reference speed $V_{ref}$, in the manner indicated below; and
- a computing unit 15 which receives this reference value $V_{ref}$ via a link 16 and determines the corresponding corrected control inputs which are sent via the link 12 to the unit 10.

To do this, according to the invention, said computing unit 15 includes:

- a computing means 17 which comprises a translational speed model and which converts a roll control item of information received via the link 3 into a controlled lateral speed $V_{con}$;
- an adder 18 which adds this controlled lateral speed $V_{con}$ (received via a link 19) to the reference speed $V_{ref}$ generated by the computing unit 14 in order to form a set lateral speed $V_{set}$;
- a computing means 20 which computes the difference between said set speed $V_{set}$ received via a link 21 and the actual lateral speed $V_{ground}$ of the helicopter He with respect to the ground, in a reference frame associated with said helicopter He, which speed $V_{ground}$ is determined by the set 4 of sensors; and
- a correcting means 22 which determines said corrected control inputs from this difference.

More specifically, said correcting means 22 slaves the speed $V_{ground}$ to the speed $V_{set}$, i.e. slaves it to a zero value of the error signal which comes from the aforementioned difference and which is received via a link 23.

According to the invention, said correcting means 22 also causes stabilization of the helicopter He, based on measured actual values received from the set 4 of sensors, as well as decoupling of the axis from the control loop, and it implements, based on the information relating to the roll control input, a precontrol for modulating the bandwidth.

Figure 3:
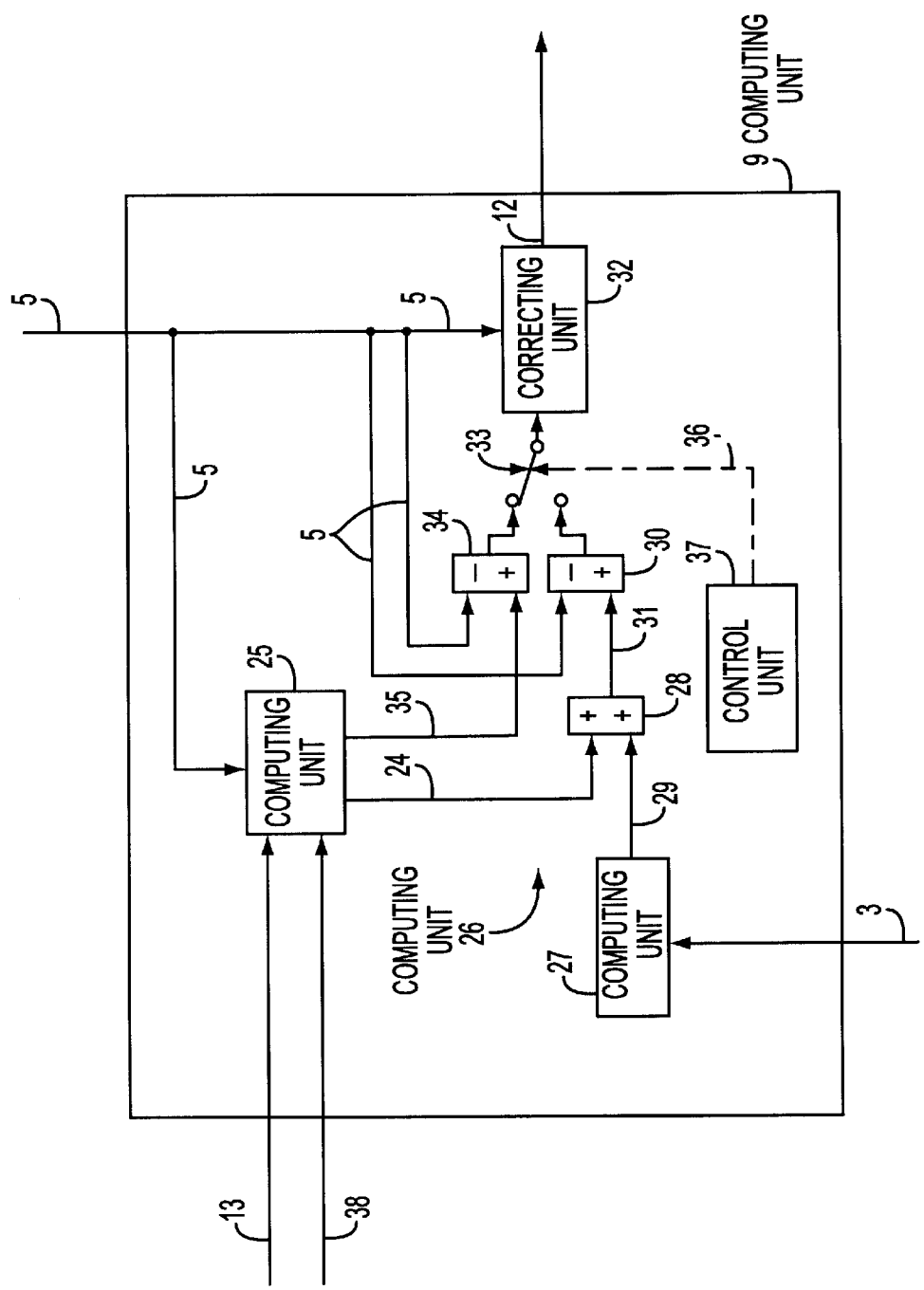
FIG. 3 illustrates diagrammatically the principle of the invention with respect to the pitch axis of the helicopter.

FIG. 3 shows diagrammatically a preferred embodiment of the computing means 9 for the control, according to the invention, with respect to the pitch axis of the helicopter He.

For this purpose, said computing means 9 include:
 a computing unit 25 which computes, from values received from the set 4 of sensors via the link 5 and specified below, a longitudinal reference speed $U_{ref}$ and a longitudinal reference acceleration $\gamma_{ref}$, as indicated above; and
 a computing unit 26 which determines the corresponding corrected control inputs which are sent via the link 12 to the unit 10.

To do this, according to the invention, said computing unit 26 includes:
 a computing means 27 which comprises a translational speed derivative model and which converts a pitch control item of information received via the link 3 into a controlled longitudinal acceleration $\gamma_{con}$;
 an adder 28 which adds this controlled acceleration $\gamma_{con}$ (received via a link 29) to the reference acceleration $\gamma_{ref}$ generated by the computing unit 25 and received via a link 24, in order to form a set acceleration $\gamma_{set}$;
 a computing means 30 which computes the difference between said set acceleration $\gamma_{set}$ received via a link 31 and the derivative of the actual longitudinal translational speed (or the actual longitudinal acceleration) $\gamma_{ground}$ of the helicopter He with respect to the ground, in a reference system associated with the latter, which acceleration $\gamma_{ground}$ is determined by the set 4 of sensors; and
 a correcting means 32 which determines said corrected control inputs.

Said correcting means 32 is capable of being connected, using a switching means 33, either to said computing means 30 or to a computing means 34.

The latter calculates the difference between the longitudinal reference speed $U_{ref}$, received via a link 35 of the computing unit 25, and the actual longitudinal speed $U_{ground}$ with respect to the ground, which is determined by the set 4 of sensors.

Furthermore, the switching means 33 is controlled, via a link 36, by a unit 37 which is capable of determining two different operating modes, namely:
 a manual mode, in which the pilot varies the longitudinal cyclic control of the helicopter He; and
 an autopilot mode, in which the pilot does not vary said longitudinal cyclic control.

According to the invention:
 in manual mode, the correcting means 32 is connected to the computing means 30 and it slaves the error signal coming from the difference between the accelerations $\gamma_{ground}$ and $\gamma_{set}$ to zero; whereas
 in autopilot mode, the correcting means 32 is connected to the computing means 34 and it slaves the error signal coming from the difference between the longitudinal speeds $U_{ground}$ and $U_{ref}$ to zero.

In addition, it will be noted that said correcting means 32 also causes stabilization of the helicopter He, based on measured values received from the set 4 of sensors, as well as decoupling of the axis from the control loop, and it implements, based on an item of information relating to the pitch control input, a precontrol for modulating the bandwidth.

Furthermore, it will be noted that, in the context of the present invention:
 the computing units 14 and 25 may be integrated into a single unit; and
 the correcting means 22 and 32 may be integrated into a single correcting means.

Assuming that the computing units 14 and 25 each comprise a digital computer running at a frequency of 1/dt, dt representing the sampling rate of said computer, and denoting the course by $\Psi(t)$, the aforementioned $V_{ref}(t)$, $U_{ref}(t)$ and $\gamma_{ref}(t)$ values may be written, according to the invention, at a time $t$ as:

$$*V_{ref}(t) = V_{ref}(t-dt) \cdot \cos[\Psi(t)-\Psi(t-dt)] - U_{ref}(t-dt) \cdot \sin[\Psi(t)-\Psi(t-dt)] + \{V_{ref}(t-dt)/U_{ref}(t-dt)\} \cdot \{U_{ref}(t)-U_{ref}(t-dt) \cos[\Psi(t)-\Psi(t-dt)] + V_{ref}(t--dt) \cdot \sin[\Psi(t)-\Psi(t-dt)]\}, \text{ and } V_{ref}(t) = V_{ground}$$

when the computing means 9 are actuated;

$*U_{ref}(t) = U_{ground}$, in manual mode, $U_{ref}(t) = U_{ref}(t-dt) \cdot \cos[\Psi(t)-\Psi(t-dt)] + V_{ref}(t-dt) \cdot \sin[\Psi(t)-\Psi(t-dt)]$, in autopilot mode and $U_{ref}(t) = U_{ground}$, when the computing means 9, in autopilot mode, are actuated; and $$*\gamma_{ref}(t) = \{U_{ref}(t-dt) \cdot \cos[\Psi(t)-\Psi(t-dt)] + V_{ref}(t-dt) \cdot \sin[\Psi(t)-\Psi(t-dt)] - U_{ref}(t-dt)\}/dt$$

The reference speeds $U_{ref}$ and $V_{ref}$ are recalculated at each cycle, depending on the change in course $\Psi$ of the helicopter He with respect to the previous cycle, in order to allow the path with respect to the ground to be maintained during rotations.

The reference acceleration $\gamma_{ref}$ is calculated at each cycle, depending on the change in the course $\Psi$ of the helicopter He with respect to the previous cycle, and serves as precontrol in order to help the system 1 to maintain the path with respect to the ground, during rotations in manual mode.

In addition, the reference speed $V_{ref}$ is recalculated at each cycle, taking into account the pilot-controlled variation in speed $U_{ground}$ in order to maintain the path of the helicopter He with respect to the ground during pilot-controlled accelerations or decelerations.

Furthermore, the reference values from the computing units 14 and 25 may be manually modified by a pilot, as indicated by a link 38 in FIGS. 2 and 3.

Moreover, said system 1 includes, as shown diagrammatically in FIG. 1:
 a value indicator 39 ca able of indicating, to a pilot of the helicopter He, the value of the lateral speed $V_{ground}$ of said helicopter He with respect to the ground; and
 a position indicator 40 which is coupled to said value indicator 39 and which is capable of indicating the position of the helicopter He with respect to a defined path, for example an approach guidance beam.

In order to clearly demonstrate the advantages of the present invention, the various successive steps (not shown) of an approach phase of the helicopter He which it is desired to be placed on a surface, for example a landing surface of a heliport or the platform of a ship, are explained in detail below:
 during the initial step of the approach phase, the helicopter He intercepts, in the usual manner, a guidance beam emitted from the ground. The wind component perpendicular to the approach path is compensated for by a course deviation;

before carrying out the deceleration necessary for initiating the steep descent, the pilot actuates the computing means 9 which then record, instantly, the two speed components $U_{ground}$ and $V_{ground}$ of the helicopter He with respect to the ground, in a reference frame associated with the helicopter;

the pilot decelerates in order to reduce the speed down to a value compatible with the approach slope. During this deceleration, the system 1 according to the invention keeps the direction of the speed, and therefore the path, with respect to the ground, constant by keeping the actual $U_{ground}/V_{ground}$ ratio constant by acting on the servocontrols producing a sideslip;

during and after the deceleration, the pilot may correct for any deviations with respect to the guidance beam by suitably actuating the control members, while monitoring, on the indicator 39, the value of the lateral speed thus generated; and near the ground, in order to perceive ground lighting in the direction of the windshield, the pilot aligns the fuselage of the helicopter He with respect to the approach path. To do this, he merely has to actuate the yaw control in order to align the fuselage with said approach path. This is because the system 1 according to the invention acts automatically in order to keep the direction of the speed vector with respect to the ground constant, and thus prevents any undesirable drift (it will be noted that, in the absence of the invention, the pilot himself would have to generate the lateral air speed in order to counteract the drift due to the wind).

What is claimed is:

1. A flight control system for an aircraft, particularly for a helicopter, said flight control system receiving a number of items of information including positions of flight control members of the aircraft, and sending, depending on said items of information, control inputs to controls of the aircraft, said system comprising:

at least one sensor for measuring actual values of at least one parameter representative of flight of the aircraft;

computing means for generating, at least from said measured actual values and from said positions of flight control members, corrected control inputs for being sent to said controls of said aircraft to enable controlling, without an external visual reference, a lateral speed of the aircraft, without varying a course of said aircraft.

2. The system as claimed in claim 1, wherein said computing means generate corrected control inputs in order to keep the direction of the speed of the aircraft with respect to the ground constant during a modification of the course of the aircraft.

3. The system as claimed in claim 1, wherein said computing means are actuable.

4. The system as claimed in claim 1, wherein said computing means generate corrected control inputs in order to keep the direction of the speed of the aircraft with respect to the ground constant during a modification of the longitudinal speed of the aircraft.

5. The system as claimed in claim 1, further comprising a value indicator for indicating, to a pilot of the aircraft, the value of the lateral speed of the aircraft with respect to the ground.

6. The system as claimed in claim 5, further comprising a position indicator for indicating, to a pilot of the aircraft, the position of the aircraft with respect to a defined path, said position indicator being coupled to said value indicator.

7. The system as claimed in claim 1, wherein said computing means comprise:

a first computing unit for computing at least one reference value from said measured actual values; and a second computing unit for generating said corrected control inputs from at least said reference value and the positions of the flight control members.

8. The system as claimed in claim 7, wherein said first computing unit calculates, as a reference value, as a function of time t, a lateral reference speed $V_{REF}(t)$ from the equation:

$$V_{REF}(t)=V_{REF}(t-dt)*\cos[\Psi(t)-\Psi(t-dt)]-U_{REF}(t-dt)*\sin[\Psi(t)-\Psi(t-dt)]+\{V_{REF}(t-dt)/U_{REF}(t-dt)\}*\{U_{REF}(t)-U_{REF}(t-dt)*\cos[\Psi(t)-\Psi(t-dt)]+V_{REF}(t-dt)*\sin[\Psi(t)-\Psi(t-dt)]\}$$

in which:

$U_{REF}(t)$ is a longitudinal reference speed of the aircraft, $\Psi(t)$ is the course of the aircraft, and dt is the sampling rate of said first computing unit.

9. The system as claimed in claim 7, wherein said first computing unit calculates, as a reference value, as a function of time t, a longitudinal reference speed $U_{REF}(t)$ from the equation:

$$U_{REF}(t)=U_{REF}(t-dt)*\cos[\Psi(t)-\Psi(t-dt)]-V_{REF}(t-dt)*\sin[\Psi(t)-\Psi(t-dt)]$$

in which:

$V_{REF}(t)$ is a lateral reference speed of the aircraft, $\Psi(t)$ is the course of the aircraft, and dt is the sampling rate of said first computing unit.

10. The system as claimed in claim 7, wherein said first computing unit computes, as a reference value, as a function of the time t, a longitudinal reference acceleration $\gamma_{ref}(T)$ from the equation:

$$\gamma_{REF}(t)=\{U_{REF}(t-dt)*\cos[\Psi(t)-\Psi(t-dt)]+V_{REF}(t-dt)*\sin[\Psi(t)-\Psi(t-dt)]-U_{REF}(t-dt)\}/dt$$

in which:

$U_{REF}(t)$ is a longitudinal reference speed of the aircraft, $V_{REF}(t)$ is a lateral reference speed of the aircraft, $\Psi(t)$ is the course of the aircraft, and dt is the sampling rate of said first computing unit.

* * * * *